(12) United States Patent
Krieger et al.

(10) Patent No.: US 11,362,858 B2
(45) Date of Patent: Jun. 14, 2022

(54) METHOD FOR TRANSMITTING DATA VIA A COMMUNICATION CHANNEL, CORRESPONDINGLY DESIGNED DEVICE AND COMMUNICATION INTERFACE, AS WELL AS CORRESPONDINGLY DESIGNED COMPUTER PROGRAM

(71) Applicant: Volkswagen Aktiengesellschaft, Wolfsburg (DE)

(72) Inventors: Olaf Krieger, Lostau (DE); Alexander Meier, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 171 days.

(21) Appl. No.: 16/977,280

(22) PCT Filed: Feb. 18, 2019

(86) PCT No.: PCT/EP2019/053915
§ 371 (c)(1),
(2) Date: Sep. 1, 2020

(87) PCT Pub. No.: WO2019/170400
PCT Pub. Date: Sep. 12, 2019

(65) Prior Publication Data
US 2021/0006432 A1 Jan. 7, 2021

(30) Foreign Application Priority Data
Mar. 5, 2018 (DE) ...................... 10 2018 105 007.0

(51) Int. Cl.
*H04L 12/40* (2006.01)
*H04L 12/64* (2006.01)

(52) U.S. Cl.
CPC .... *H04L 12/40163* (2013.01); *H04L 12/6402* (2013.01); *H04L 2012/40273* (2013.01); *H04L 2012/6408* (2013.01)

(58) Field of Classification Search
CPC ........... H04L 12/40163; H04L 12/6402; H04L 2012/40273; H04L 2012/6408
See application file for complete search history.

(56) References Cited

U.S. PATENT DOCUMENTS 6,167,030 A    12/2000  Kilkki ........................... 370/236
9,888,079 B2 *  2/2018  Jackson ................. H04L 12/46
(Continued)

FOREIGN PATENT DOCUMENTS

CN    1349332 A    5/2002    ............. H04L 12/28
CN    101414974 A  4/2009    ........... H04L 12/801
(Continued)

OTHER PUBLICATIONS

Chinese Office Action, Application No. 201980017298.8, 10 pages, dated Aug. 18, 2021.
(Continued)

*Primary Examiner* — Luat Phung
(74) *Attorney, Agent, or Firm* — Slayden Grubert Beard PLLC

(57) ABSTRACT

The invention relates to a method for transmitting data via a communications channel (106), in which the data is transmitted with a transmission frame, wherein the transmission frame has at least one prioritisation field (PCP) for establishing the priority of the message and a data field, wherein the prioritisation field (PCP) functions to control the bus access by prioritising the messages. For this purpose, a bus access controller is used, in which the priority of at least the last received data packet is stored in a minimum priority storage cell (330). After receiving a data packet, a timer
(Continued)

(320) is started, for which a timeout value is set, which is reset when a following packet is received. After reaching the timeout value, a decrementing of the value stored in the minimum priority storage cell (330) occurs. Thereafter, for the purpose of bus access control, when sending a packet, it is checked whether the priority of the packet to be sent is lower than the value stored in the minimum priority storage cell (330), and the sending of the data packet is prevented if the priority of the packet is lower than the value stored in the minimum priority storage cell (330).

20 Claims, 7 Drawing Sheets

(56) References Cited

U.S. PATENT DOCUMENTS

| | | | |
|---|---|---|---|
| 2004/0047594 A1 | 3/2004 | Towler et al. | 386/330 |
| 2005/0249113 A1* | 11/2005 | Kobayashi | H04L 12/4641 370/461 |
| 2006/0171410 A1 | 8/2006 | Jung et al. | 370/447 |
| 2008/0175265 A1 | 7/2008 | Yonge et al. | 370/447 |
| 2009/0196306 A1 | 8/2009 | King et al. | 370/462 |
| 2017/0075838 A1* | 3/2017 | Nooney | H04L 49/1515 |
| 2017/0134292 A1 | 5/2017 | Kellermann et al. | 370/447 |
| 2019/0196998 A1* | 6/2019 | Koike | G06F 13/372 |

FOREIGN PATENT DOCUMENTS

| | | | |
|---|---|---|---|
| DE | 102009006898 A1 | 8/2009 | H04L 12/413 |
| DE | 102014214457 A1 | 1/2016 | H04L 12/413 |
| DE | 102018005107 A1 | 1/2020 | H03K 17/0424 |
| EP | 0258604 B1 | 12/1993 | H04L 12/433 |
| WO | 2019/170400 A1 | 9/2019 | H04L 12/40 |

OTHER PUBLICATIONS

Gehrsitz, Thomas et al., "Analysis of Medium Access Protocols for Power Line Communication Realizing In-Car Networks," IEEE 80th Vehicular Technology Conference, 7 Pages, Sep. 14, 2014.

Gehrsitz, Thomas et al., "Priority-Based Energy-Efficient MAC Protocols for the In-Car Power Line Communication," IEEE Vehicular Networking Conference, p. 61-68, Dec. 3, 2014.

German Office Action, Application No. 102018105007.0, 6 pages, dated Oct. 9, 2018.

International Search Report and Written Opinion, Application No. PCT/EP2019/053915, 16 pages, dated Apr. 9, 2019.

* cited by examiner

METHOD FOR TRANSMITTING DATA VIA A COMMUNICATION CHANNEL, CORRESPONDINGLY DESIGNED DEVICE AND COMMUNICATION INTERFACE, AS WELL AS CORRESPONDINGLY DESIGNED COMPUTER PROGRAM

CROSS-REFERENCE TO RELATED APPLICATIONS

This application claims priority to German Patent Application No. DE 10 2018 105 007.0, filed on Mar. 5, 2018 with the German Patent and Trademark Office. The contents of the aforesaid Patent Application are incorporated herein for all purposes.

TECHNICAL FIELD

The invention relates to the technical field of data transmission between electronic components, in particular control units, sensors and actuators that are networked through a bus system. Such control units are frequently used in motor vehicles. Networked control units, sensors and actuators are also used in other fields of technology, for example in automation, process engineering, etc. The invention is however not restricted to wired data transmission, but can also be used for wireless data transmission systems. The invention also relates to a correspondingly designed communication interface, as well as a correspondingly designed computer program.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Numerous control units are installed in modern vehicles. Many control units are used just for the drive train such as for example the engine control unit, transmission control unit, ESP control unit and others. The class of control units that are responsible for regulations of chassis can also be mentioned. These are control units for electronic chassis adjustment, or control units for regulating driving dynamics, or control units that function as power steering such as for example speed-dependent power steering. In addition, there are also other control units that are installed in the area of the vehicle body and supply certain comfort functions. Examples to be mentioned are door or window regulator control units, air conditioning control units, seat adjustment control units, airbag control units, etc. Then there is the class of control units which belong to the area of infotainment such as the camera control unit for observing the surroundings, the navigation unit, the RADAR or LIDAR unit, the communication module and entertainment module with a TV, radio, video and music function.

There is a trend in engineering for IP communication in the form of IPv6 or Ipv4 to be increasingly used in the future for the vehicle-internal networking of control units. In this case, IP packets are transmitted that can have a length of up to 64 kB. It is true that the IP packets can be transmitted in a segmented fashion; however, the use of IP communication requires that a bus technology be used which can transmit sufficiently large messages.

Typically, the control units of the different categories are each networked using a separate bus correspondingly designed for the category of unit. Several different bus systems may therefore be used within the vehicle. The different bus systems can be linked to each other by gateways to enable an exchange of data. Within the area of drive train control units, typically the CAN bus is used, as well as within the area of comfort control units. In the area of infotainment, other bus systems are also used such as bus systems that are based on Ethernet technology. Bus systems that use optical waveguides for data transmission may also be used. The MOST (Media Oriented System Transport) bus or D2B bus (Domestic Digital Bus) are cited as examples.

In vehicles and other systems in the area of control and regulation engineering, Ethernet-based network technologies are being used to an increasing extent. The Ethernet bus system originates from the early days of networking computers and was developed at the Xerox PARC Palo Alto Research Center in the late 1970s. Since 1980, the Institute of Electrical and Electronics Engineers (IEEE) has been responsible for Ethernet maintenance and development. The 802 Working Group is responsible for Ethernet. Ethernet-related standards are therefore identified with a leading 802 (such as IEEE 802.1, IEEE 802.2, IEEE 802.3, etc.).

A great strength of the Ethernet is that there are ready-made protocols for transporting a wide variety of useful data such as video/audio data, etc., and a wide variety of physical media are supported today that also permit its use within a motor vehicle. Since the physical media are independent of the transmission protocol, other transmission techniques can also be easily developed and adapted to the requirements of the automobile branch.

In an Ethernet network, normally all messages are processed with the same priority. In vehicle networks, there are however communication links that require very short communication latency times. Other links in contrast have only very minimal requirements with respect to latency.

For the area of motor vehicles, different Ethernet versions have been developed. First, there are the IEEE 100BASE-T1 and IEEE 1000BASE-T1 versions. The transmission of data in a forward and backward direction is only provided through one twisted conductor pair. There is a physical layer block which can also be installed in each case as its own module/chip in a control unit (ECU). This block represents the link between the physical medium (network cable) and the Ethernet controller block.

In this Ethernet version, only just two nodes are always connected to a one bus line. As the topology, only the point-to-point link is therefore available. More than two nodes can be connected with the assistance of a coupling element. In this case, normally a network switch is used that, as a layer 2 coupling element, permits the connection to several physical links and can independently transmit messages from branch to branch. This is one of the greatest disadvantages of the Ethernet bus system within the area of motor vehicles because it drives up costs.

Consequently, the use of CAN (Controller Area Network) buses according to the ISO standard dominates the motor vehicle sector. The CAN bus was developed in the 80s and standardized in 1994. The corresponding ISO standard has the number ISO 11898. This bus has been so successful within the motor vehicle sector because it is real-time capable with a slight amount of cabling. Issuing message priorities and taking them into account in bus arbitration ensures that the message with the highest priority always gets through on the bus. The disadvantages are, however, the low data rate and, as mentioned, the difficulties associated with the transmission of IP packets.

There are expansions of the Ethernet standard by means of which a network participant can take into account priorities when sending if it has several messages at one time in different queues that belong to different communication links. Worth noting here are the Ethernet versions IEEE 802.1Qxx in which a network participant sets up several send queues and has the option in each sending process to select a message from the queue with the highest priority. The version IEEE 802.1Qbv is noted in particular in which a method is defined that functions such that the sending of messages of a certain priority is interrupted after a certain number of messages in order to also be able to also send messages with a lower priority at regular intervals. This method is termed a traffic shaper.

In IEEE 802.1Q, only the particular messages to be sent by the station are considered when prioritizing messages. In this context, a sender can either be the original source of a message or a network bridge, i.e., a network participant that forwards messages from one network segment to another. In many cases, Ethernet-based networks are designed so that a network segment always consist of just one sender and one receiver. In this case, large multiport bridges (also termed an Ethernet switch) are used in which just one other network participant (end node or bridge port) with a full-duplex connection, i.e., with one dedicated communication channel per communication apparatus, is connected to each port. For this type of network design, it is generally sufficient if the priorities are only considered locally in the sender in order to give the messages to the transmission medium in an appropriate sequence.

There are however also network technologies in which there are several participants in a single network segment. In particular, the linear bus structure so tried-and-true in a motor vehicle is to be supported were several control units are networked without using a network switch as the coupling element. This bus structure is optimum in terms of the amount of cabling and cost. An improved 10 Mbit/s Ethernet version was developed by the IEEE organization in order to address these considerations. In doing so, the bus participants divide up the available 10 Mbit/s bandwidth. The new transmission protocol is also real-time capable. At the same time, it is able to be administered in a decentralized fashion. This means that it should not be necessary to provide all participants of the network with an identical configuration. This allows the amount of developmental effort to be significantly reduced. In this context, the 10 Mbit/s Ethernet derivative IEEE 802.3cg was developed in which all participants are connected to a common electrical bus line. However with this version as well, there is still the problem of considering the priorities of messages over the entire network segment without bus access conflicts occurring. The same problem also exists with radio networks in which all participants use the same frequency.

SUMMARY

An object exists to overcome the described disadvantages when implementing IP communication in the area of networks with a linear bus structure, and also with wireless networks. In particular, a prioritization of the messages to be transmitted must be enabled.

This object is achieved by a method for transmitting data via a communication bus, a device for performing the method, a correspondingly designed communication interface, and a correspondingly designed computer program according to the independent claims. Embodiments of the invention are discussed in the dependent claims and the following description.

DESCRIPTION

Figure 1:
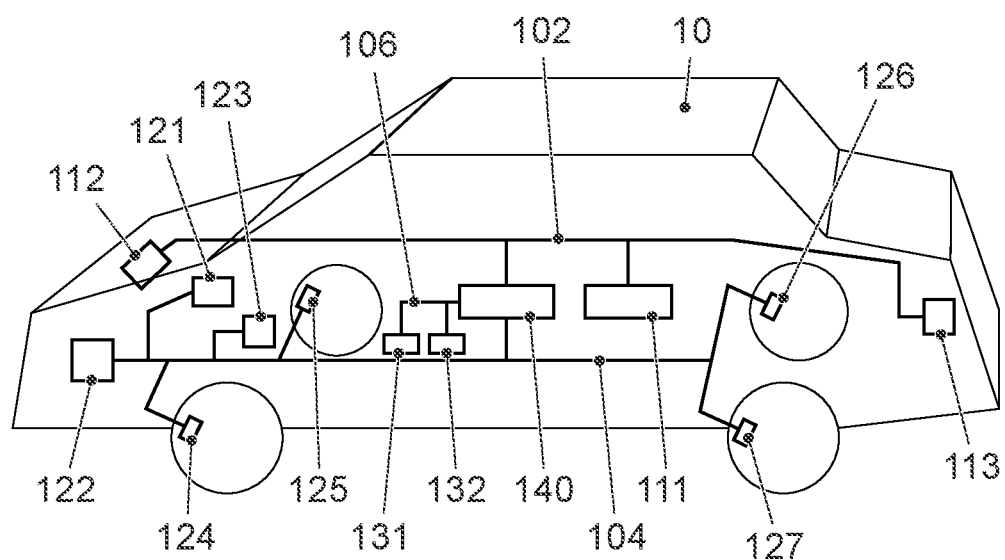
FIG. 1 shows an exemplary vehicle with the motor vehicle electronics components for the areas of the drive, chassis and driver assistance.

The details of one or more embodiments are set forth in the accompanying drawings and the description below. Other features will be apparent from the description, drawings, and from the claims. In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first exemplary aspect, the solution consists of transmitting the data with a transmission frame via the communication channel, wherein the transmission frame has at least one prioritization field for establishing the priority of the message and one data field, wherein the prioritization field serves to regulate bus access by prioritizing the messages. The solution is distinguished in that a bus access control is used in which the priority of at least the last received data packet is saved in a minimum priority memory cell, wherein after a packet is received, a timer is started for which a timeout value is set. The timer is reset upon the reception of a following packet. When a send pause occurs, the timeout value is exceeded. After the timeout value is reached, to control bus access, a decrementing occurs of the value saved in the minimum priority memory cell. Moreover to control bus access when sending a packet, a check is performed in the sending station as to whether the priority of the packet to be sent is less than the value saved in the minimum priority memory cell, and the sending of the packet is prevented if the priority of the packet is less than the value saved in the minimum priority memory cell. The benefit is that by successively reducing the value in the minimum priority memory cell, participants who could not access the bus in the previous cycle obtain an increasingly greater chance of transmitting their data packets pending in the queue. Latency periods that occur are thereby reduced so that the transmission process may also be used for time-critical applications.

In some embodiments, a value saved in the minimum priority memory cell is decremented in each case by the value "one". The behavior of the communication system may be best simulated and predicted in this version.

In some embodiments, the decrementation value is increased stepwise after the timeout value has been reached two or more times. This makes it possible for low priority messages to gain relevance faster and be more likely to be transmitted during sending pauses. In one form of these embodiments, the decrementation value is increased stepwise by the value "one" after each attainment of a timeout value.

In some embodiments, instead of decrementing the value saved in the minimum priority memory cell when the timeout value is exceeded, the value saved therein is reset to the value of zero or another minimum value. According to this variant, the lower priority messages may be transmitted even more quickly in a sending pause.

In some embodiments, when a data packet is received, a higher priority value, in particular the maximum priority value, is saved in the minimum priority memory cell instead of the priority value of the received data packet. The high-priority messages are thereby particularly preferred when accessing of the bus.

Finally and in some embodiments, a further measure may be used to ensure that when the workload is high, low-priority messages that had to wait a long time for transmission are still transmitted. To accomplish this, the priority value of a data packet that had to wait in a queue for a certain number of transmission cycles and was still not transmitted is simply set to a higher value in the sending station.

Some embodiments provide increasing the value range for the utilized priorities and configuring the network so that there are no two network participants that are sending with the same priority. When designing a network, it may be established that one of the competing communication participants is always favored.

For a correspondingly designed device for performing the proposed method and a correspondingly designed communication interface, the corresponding benefits apply as explained in conjunction with the corresponding method steps.

The same holds true for a correspondingly designed computer program that performs the steps of the proposed method for transmitting data when processing in a computing unit. It is true that hardware costs play a central role in the motor vehicle sector; accordingly, primarily less powerful microcontrollers are used here that are supported by separate network controllers in which the data transmission protocol is realized with special hardware. In other areas, such as the area of field buses for automation or process engineering, more powerful microcontrollers are also used for which the software solution to implement the expanded data transmission protocol is then also applicable.

Embodiments of the invention are shown in the drawings and explained in greater detail in the following with reference to the FIGS.

The present description illustrates the principles of the disclosure according to the invention. It should therefore be understood that a person skilled in the art will be able to conceive of various arrangements which, although not explicitly described here, embody principles of the invention, which are considered to be within the scope of the invention.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a vehicle 10 with various electronic components. A passenger car is shown. However, any other vehicles would also be possible as the vehicle. Examples of other vehicles include: Buses, commercial vehicles in particular trucks, agricultural machines, construction machines, motorcycles, rail vehicles, etc. The invention could for example be applied to land vehicles, rail vehicles, watercraft and aircraft. One use is primarily conceived for the automotive sector. However, as with CAN buses, use is also possible for the field bus sector, i.e., in automation, process engineering, etc. A plurality of electronic control units is used in the modern motor vehicle. FIG. 1 shows the networking of control units and sensors. Three different classes of control units are distinguished. The control units of one class are each networked separately. The respective communication buses are connected by a central gateway control unit 140. The control units of the class of control units for the area of driver assistance are networked by the bus 102. Connected thereto are the control units of the driver assistance control unit 111, the RADAR control unit 112 and the ultrasonic sensor control unit 113. In this case, the RADAR (corresponding to Radio Detection and Ranging) unit serves to realize a radar cruise control, or to realize a distance warning or collision warning unit. For this, a LIDAR unit (corresponding to Light Detection and Ranging) may be used in addition or alternatively.

The control units of the class of control units for the drive train are networked by bus 104. Connected thereto are the control units of the engine control unit 121, ESP control unit 122 and transmission control unit 123. Also connected to the bus 104 are the wheel speed sensors 124 to 127. The control units of the class of control units for the area of the chassis are networked by the bus 106. Connected thereto are the control units of the chassis control unit 131 and power steering control unit 122.

Figure 2:
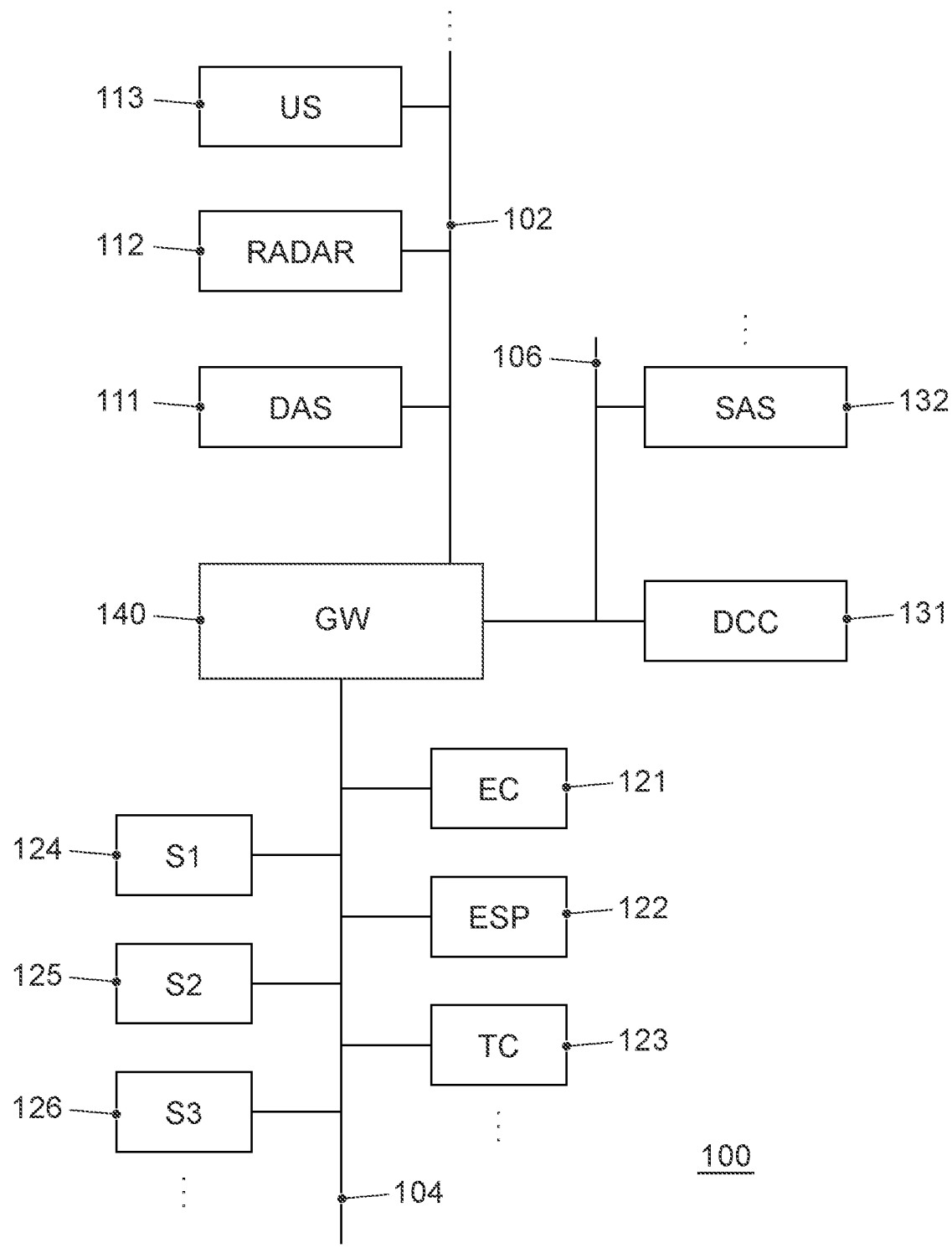
FIG. 2 shows an exemplary block diagram of a vehicle onboard network for the areas of the drive, chassis and driver assistance.

FIG. 2 shows the corresponding block diagram for the motor vehicle electronics in the areas of the drive, chassis and driver assistance. In FIG. 2, the same reference numbers identify the same components as in FIG. 1. The three separate communication buses 102, 104, 106 are designed as linear buses. The bus protocols for the communication buses 102, 104 and 106 are designable according to the needs of the control units networked there. For example, it could be recommendable to design the communication bus 106 for the area of the chassis with higher data rates than the two communication buses 102 and 104. The sensor signals that are relevant for the chassis must be reacted to extremely fast, for example for the comfort feature of pothole recognition in order to be able to correspondingly adapt the damper setting.

The gateway 140 is provided for the purpose of exchanging data between participants that are connected to different communication buses 102, 104, 106. This is connected to all three different bus systems 102, 104 and 106. The gateway 140 is designed to transform the data packets received by the one communication bus so that they may be forwarded to the other communication bus in its transmission format. As shown, the gateway 140 is connected as a central unit both to the bus 102, the bus 104 as well as to the bus 106. It therefore assumes all necessary format transformations when data are to be exchanged between the various bus systems.

As mentioned above, a communication bus should be used that makes it possible to also transmit data packets according to the IPv4 or Ipv6 protocol. To do this, it is useful to use a version of the Ethernet standard family. For this, there are already ready-made transmission protocols such as IP (Internet Protocol), UDP (User Datagram Protocol), RTP (Real-time Transport Protocol), TCP (Transmission Control Protocol) that may be accessed. The development effort with regard to the transmission protocols is then kept within bounds. Ethernet network technology largely corresponds to the IEEE standard 802.3. As mentioned, in conjunction with the present disclosure, particularly the version IEEE 802.3cg is relevant to the use of this technology in motor vehicles. Reference is therefore expressly made to this specification in conjunction with the present disclosure.

As a physical transmission medium, a twisted two-wire line is used to which the symmetrical differential voltages for information transmission are applied. The voltages represent symbols that a sender generates according to the desired bit stream (encoded). A recipient uses the arising stream of symbols in order to recover the contained bits (decoding).

A particular attraction of this physical layer is that information may be transmitted on a UTP cable (a cable with a twisted conductor pair without shielding, corresponding to an unshielded twisted pair) at 10 Mbit/s.

In contrast to the existing standards for 100 Mbit/s and 1 Gbit/s, a jointly-used transmission channel (shared medium) is used. This means that only a maximum of one network participant may send at a time (see the FIG.).

For the reasons already discussed above, the communication bus 106 is designed for the area of the chassis pursuant to the version IEEE 802.3cg, and the two other buses 102 and 104 may either be designed according to this version, or according to one of the versions IEEE 100BASE-T1 or IEEE 1000BASE-T1. In the following, it will be assumed that the communication bus 102 is also designed according to the version IEEE 802.3cg.

Figure 3:
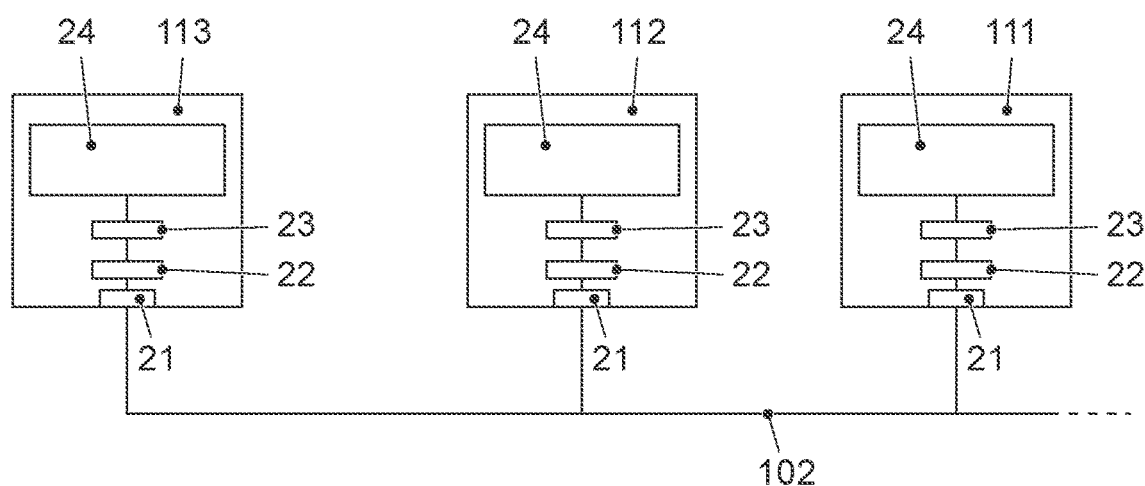
FIG. 3 shows an exemplary block diagram of the vehicle onboard network for the area of driver assistance.

The principle of networking electronic components by means of the communication bus according to some embodiments is shown in greater detail in FIG. 3. As an example, the communication bus 102 is shown for the area of driver assistance. All control units 111 to 113 are connected to the communication bus 102. Likewise, the gateway 140 is also connected to the communication bus 102 (not shown). The structure of the communication bus 102 is linear. The already mentioned twisted unshielded UTB two-wire line is used as the bus line.

The network participants typically consist of at least one microcontroller 24 on which the application software runs, and a communication interface. Ethernet-based network interfaces consist of a PHY (PHYsical layer) part and a MAC (Media Access Controller) part. The PHY block is responsible for transforming the digital packets that originate from the MAC part into digital signals that are transmitted via the transmission medium. The PHY block is frequently realized as a separate chip. Likewise, the MAC block may also be realized as a separate chip. Moreover, the PHY controls the access to the transmission medium by ensuring that two participants never simultaneously attempt to write to the transmission medium.

In the example in FIG. 3, a physical layer chip 22 is also in each control unit 111 to 113, and it is also connected to a bus adaptation circuit 21 for connecting to the bus line. An Ethernet MAC layer chip (Media Access Control) is identified by reference number 23 and is also termed a network controller. A microcomputer is identified with reference number 24 on which the application software is installed as the host IC. Other network protocols are also installed on this microcomputer 24. The Ethernet MAC frame is supplied by the Ethernet MAC layer. The associated network protocol stack is installed in the microcomputer 24.

From the data to be transmitted, the MAC 23 generates the Ethernet data frame and transmits it bitwise (typically four bits parallel) to the PHY 22 for transmission once this signals that it possesses the right to write to the transmission medium. Messages from other participants are read by the PHY 22 and transmitted bitwise to the MAC chip 23. From this, the MAC 23 assembles a receive Ethernet data frame and decides whether the packet was intended for it and must be processed further, or may be rejected. The second layer of Ethernet communication provides important basic functions for regulated data transmission. In addition to the uniform message structure, this also includes addressing the participants, as well as the bus access procedure. In a silicon on-chip implementation (SoC), all blocks 21 to 23 may be integrated together in the microcontroller 24.

Modern MAC implementations possess several send and receive queues with different priorities. A scheduler within the MAC 23 establishes the queue from which the first element is removed in order to be transmitted. For real-time systems such as control and regulation systems within a vehicle, a strict priority scheduler is used. Consequently, the messages with the highest priority are always transmitted first, and only when no more high-priority packets are in the queue, packets are transmitted from the queue with the next-lowest priority.

The PHY is responsible for write-access to the joint transmission medium. To prevent collisions that arise in the event of simultaneous write access to the transmission medium by several participants, a collision avoidance method is required. PLCA (PHY level collision avoidance) is employed for use in the 10 Mbit/s automotive Ethernet. In this method, each participant has a dedicated time window within which only it may send data. When the sending process has been concluded or the participant has not started sending within a predetermined time, the next participant is in line. After all participants have had the opportunity to send a frame, the communication cycle starts from the beginning. This process is shown in FIG. 4.

Figure 4:
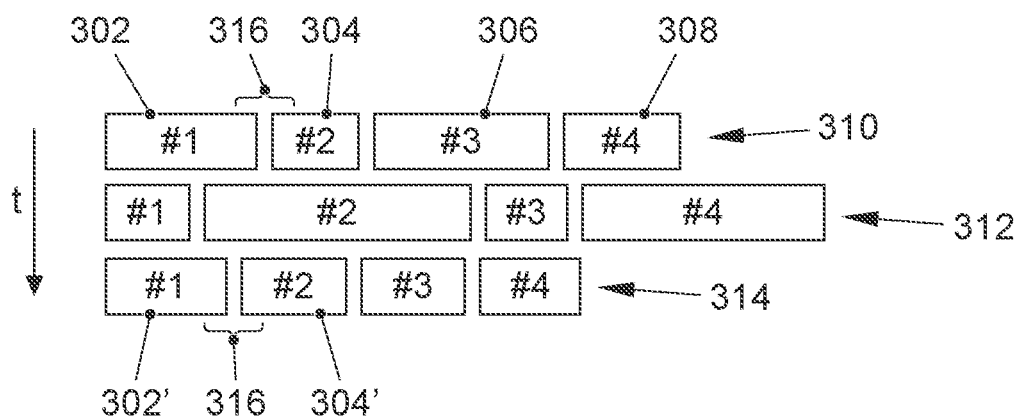
FIG. 4 shows a depiction of how the PLCA collision avoidance process functions.

In FIG. 4, the different sending time windows 302, 304, 306, 308 are arranged next to each other (packet numbers #1 to #4). One line corresponds to a communication cycle. In a communication cycle, the participants may access sequentially according to a round-robin method. The maximum packet length is however limited. In the FIG., three communication cycles 310, 312, 314 are shown. Between the sending time windows is a pause 316 of a specific length from which it may be recognized that the previous sending has concluded. The duration of a sending time window 302, 304, 306, 308 depends on the amount of transmitted data. If a network participant does not send any data, several pauses 316 occur one after the other. This type of access method is termed fair because all of the participants in the network have the same chance of sending packets.

With the PLCA method, priorities may only be implemented locally, but not network-wide, however. This means that if several packets with a different priority are available in the station ready to be sent, the MAC chip 23 may ensure that the packet with the highest priority will always be transmitted first. However, it may occur that other participants block the joint transmission medium with packets of a lower priority. Since the access method is fair as described above, all participants have the same right to send packets independent of how high their priority is.

For real-time systems such as for example control and regulation systems in a vehicle, this method may have disadvantages. For real-time-relevant data, a maximum permissible latency is always indicated. An access method is therefore required with which it may be ensured that higher priority packets may be sent within a given time even when there is a high network load (maintenance of "worst-case latency").

Figure 5:
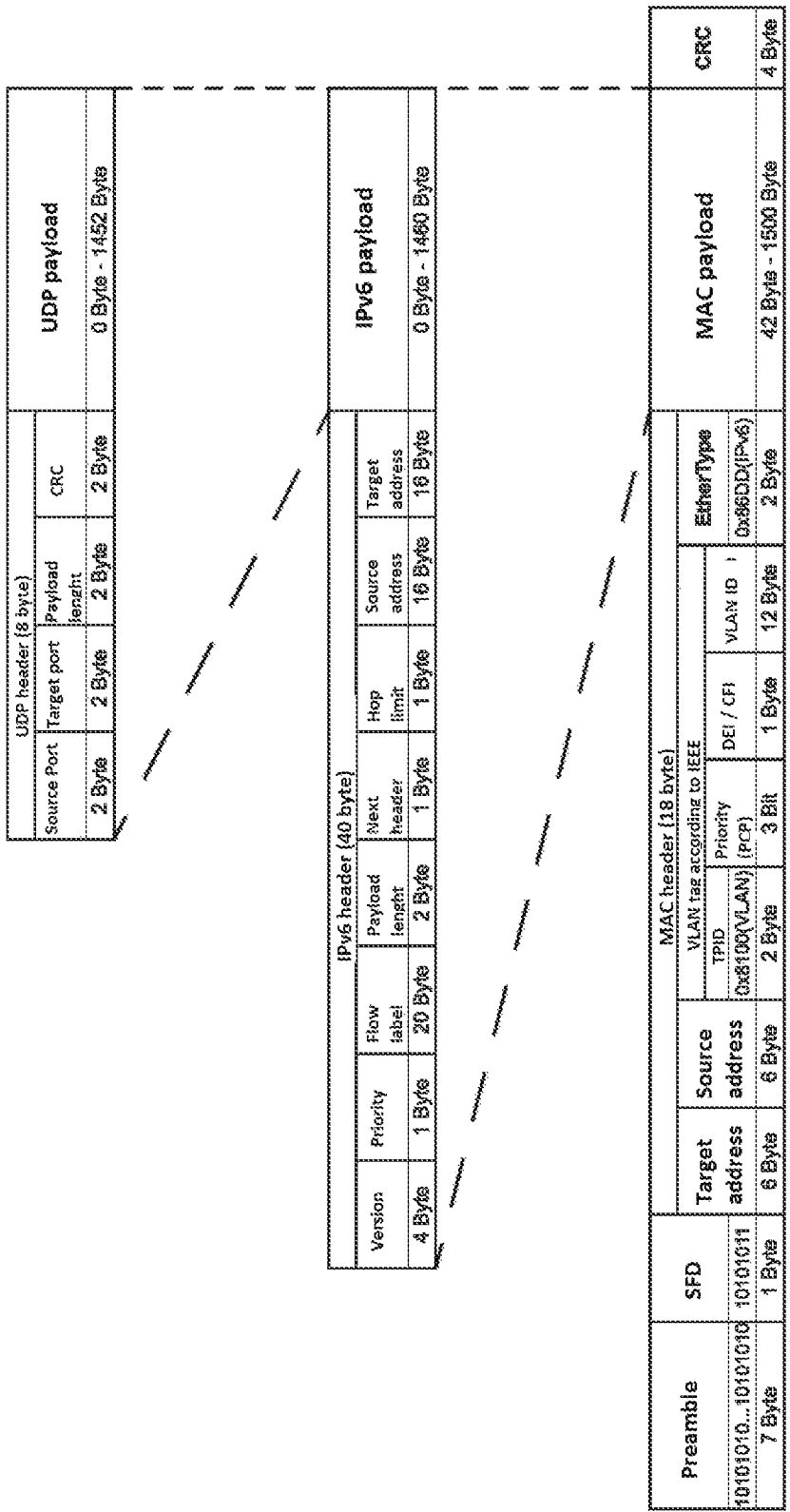
FIG. 5 shows the detailed transmission frame format of an Ethernet frame according to the IEEE 802.1Q specification.

FIG. 5 firstly shows the transmission frame format that is also used with Ethernet bus version IEEE 802.3cg. The so-called tagged MAC frame is portrayed that may be preferred in the vehicle sector. In the bottom part, the format of an Ethernet packet for this version is shown. The two first sections, the preamble and SFD, are only part of the Ethernet packet. The actual Ethernet frame, also termed the Ethernet MAC frame, begins just afterwards. To transmit the Ethernet frames, an Ethernet PHY adds the preamble at the beginning as well as the start frame delimiter (SFD). In IEEE 100BASE-T1, these serve to signal the start of transmission, i.e., the synchronization already mentioned above. The Ethernet MAC frame consists of the fields MAC header, MAC payload and the CRC field. The MAC header consists of the sections for the target address, source address, VLAN tag and the EtherType. In the sections of the target address and source address, the MAC address for the target and the source, respectively, is entered. The type field EtherType is used to distinguish between the basic and tagged MAC frame. This generally identifies the packets contained in the payload area and provides information about employed protocols in the higher levels (such as IPv4, IPv6). A VLAN ID (such as 0x8100) is in the tagged MAC frame in the field VLAN tag. If this is present, the type field EtherType is shifted four bytes to the rear, and the VLAN tag is inserted at its original position.

A VLAN tag consists of a protocol identifier (TPID) (corresponding to the VLAN ID) and control information (TCI). The TCI consists of a priority (PCP), a drop eligible or canonical form indicator (DEI or CFI) as well as an identifier (VID). In the automobile branch, primarily the identifier VID and the priority field PCP are used. The identifier VID identifies the particular virtual network for the different areas of application. The priority allows the optimization of runtimes by network switches so that important information may be preferentially forwarded. In the shown example, the priority field only has a length of 3 bits. If a different message format is used than the one described in IEEE 802.1Q, it is also possible to configure the priority field to a greater length. With a length of 10 bits, priority levels from 0 to 1023 could be depicted.

In the useful data area of the Ethernet frame (MAC payload), information with a variable length may be transmitted. With a tagged MAC frame, the payload field has a minimum length of 42 bites. With the version according to the IEEE 100BASE-T1 specification, even up to 1500 bytes may be contained therein.

In the CRC field at the end of the MAC frame, a CRC checksum is transmitted. The contained value is calculated with the assistance of a standardized algorithm that is implemented the same in the sender and the receiver. The calculation is done with all the fields of the Ethernet MAC frame and therefore secures the entire message.

In the middle part of FIG. 5, the format of an Ipv6 packet with a size of 1500 bytes is shown. It is completely located within the useful data field of the Ethernet MAC.

Above this is a UDP packet which corresponds to user datagram protocol. It has a length of 1460 bytes and is completely located within the useful data field of the Ipv6 packet.

A method in which also the priorities of the packets are also taken into account in bus accessing is described in the earlier patent application DE 10 2017 130 547.5 by the same applicant. Each transmitted data packet contains priority information. The Ethernet standard IEEE 802.1Q provides a 3 bit value for this. In FIG. 5, the 3 bit field for the priority is identified by PCP. In the following examples, the 3 bit value will be assumed. The value corresponds to the lowest priority, and the value 7 to the highest priority.

Each participant observes the data on the transmission medium 208 and saves the highest observed priority value of the last communication round. This means that if the participant may send within the time window n, it evaluates the priority information from the time windows starting at n+1 of the last communication cycle, as well as the time window up to n−1 of the current communication cycle. In this application, the priority information of the last packet that it sent is saved in a memory cell in the PHY chip 22. In a beneficial implementation of the method, the PHY chip 22 operates on the assumption that the priorities in the next communication cycle are identical with those in the last cycle. This assumption is true especially when messages to be transmitted are divided into several smaller packets for transmission. In this case, the PHY chip 22 only sends its data packet when the priority of its own selected packet is just as high or higher than the highest observed priority of another communication participant. When the priority of its own packet is lower, it does not assert the right to send and thereby does not block the joint communication channel with a low priority packet. If all of the participants in the network observe this requirement, messages with a higher priority may be transmitted without being interrupted by packets with a lower priority.

The method described in the following is independent of the actually used physical transmission medium and may be used for different speeds and both for wired transmission as well as for wireless transmission.

The method requires that each participant in a network is technically able to observe (receive) the transmissions of the other participants. Networks with these properties are termed a broadcast medium.

Each message that is transmitted in the network segment possesses priority information, for example according to IEEE802.1Q. The entire network participants evaluate the priority information from all the messages transmitted on the transmission medium. Each participant possesses a memory cell in which the current permissible minimum priority is saved. The value of this memory is modified, or respectively updated upon each reception of a message or expiration of a timer. The memory cell is however arranged in the MAC chip 23 in contrast to the method proposed in DE 10 2017 130 547.5. This has significant benefits with respect to processing the data packets according to the OSI/ISO layer model of data communication.

Figure 6:
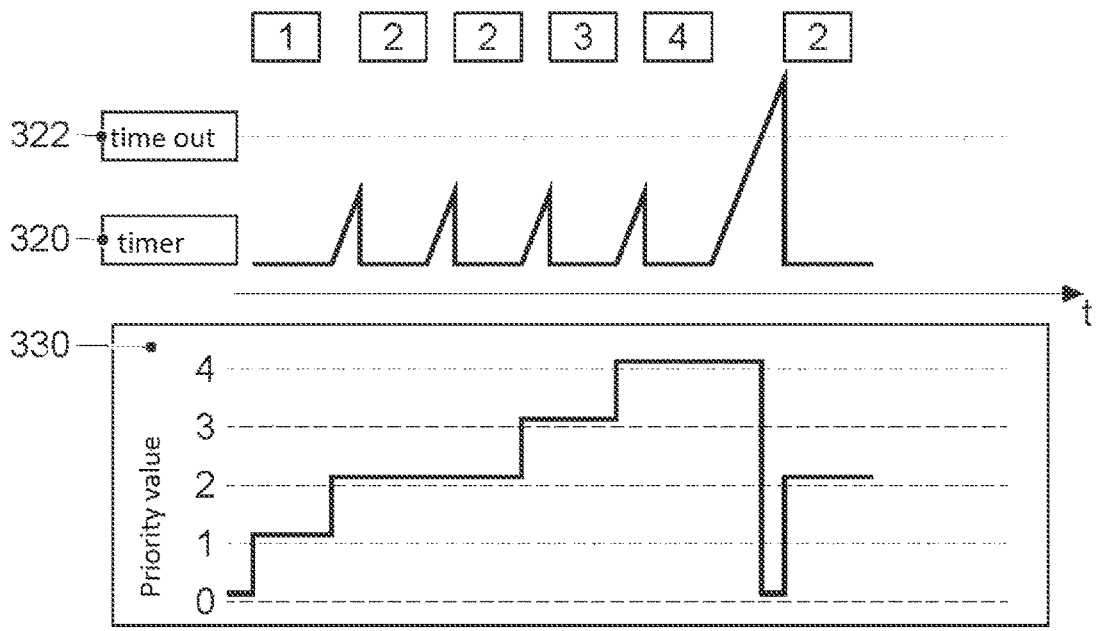
FIG. 6 shows a first exemplary embodiment of how message priorities may be used for controlling bus access.

If a network participant wants to send a message with a certain priority, it must first check whether the priority of the message to be sent is the same size or larger than the current value of the permissible minimum priority. Messages with the same priority or higher may be sent immediately (once the bus access method of the physical layer signals that the transmission medium is available). Messages with a lower priority are held back until the value of the permissible minimum priority has dropped to a level that permits sending. FIG. 6 shows the scheme.

The sequentially transmitted data packets are portrayed in the top line. For each packet, the priority that is assigned to this packet is indicated. The memory cell for the minimum priority is identified in FIG. 6 with reference number 330. The bottom part of FIG. 6 shows the respective entries in the memory cell for the value of the permissible minimum priority. As described, the priority that the last received data packet had is entered there. At the beginning of communication, the value in the memory cell 330 is set to zero. If a message with the priority 1 is observed on the transmission medium, the value is updated to 1. The same thing happens when the priorities 2 to 4 are observed in the example shown in FIG. 6. Upon each receipt of a message, a timer 320 (time counter) is reset. It then starts, and is reset upon the receipt of a new packet. FIG. 6 shows that the timer 320 has started four times and was reset before reaching the timeout value. The timeout value may be programmed in another memory cell 322. If the timer 320 is not reset for a long period, i.e., the set timeout value is exceeded, the value of the permissible minimum priority is reset to 0. This allows messages with a lower priority (in the example, a packet with priority 2 follows afterwards) to be sent. To simplify the FIG., the number of possible priorities was restricted to 4. In a practical implementation, the values up to priority 7 may be implemented, or any number of priorities may be implemented if the PCP field is enlarged. The memory cells 320 and 322 for the timer and the timeout value are also located in the MAC chip 23.

With the implementation shown in FIG. 6, the value of the minimum priority returns to the value zero after exceeding the timeout value. If in this situation several network participants have ready-to-send messages, any participant will send a message as the first one. This is not necessarily the participant who wants to send a message with a high priority. It is possible for a participant with a low priority to be the first one to send, and a participant with a high priority message must wait. The situation may repeat if, following the message with the low priority, another participant sends another message with a low or only slightly higher priority. This behavior is termed a priority reversal and may lead to a difficult-to-predict delay for high-priority messages upon switching from a high to low priority. The variation of the method described below therefore provides not setting the priority to 0 after the timeout has been exceeded, but only decrementing it by a certain value.

Figure 7:
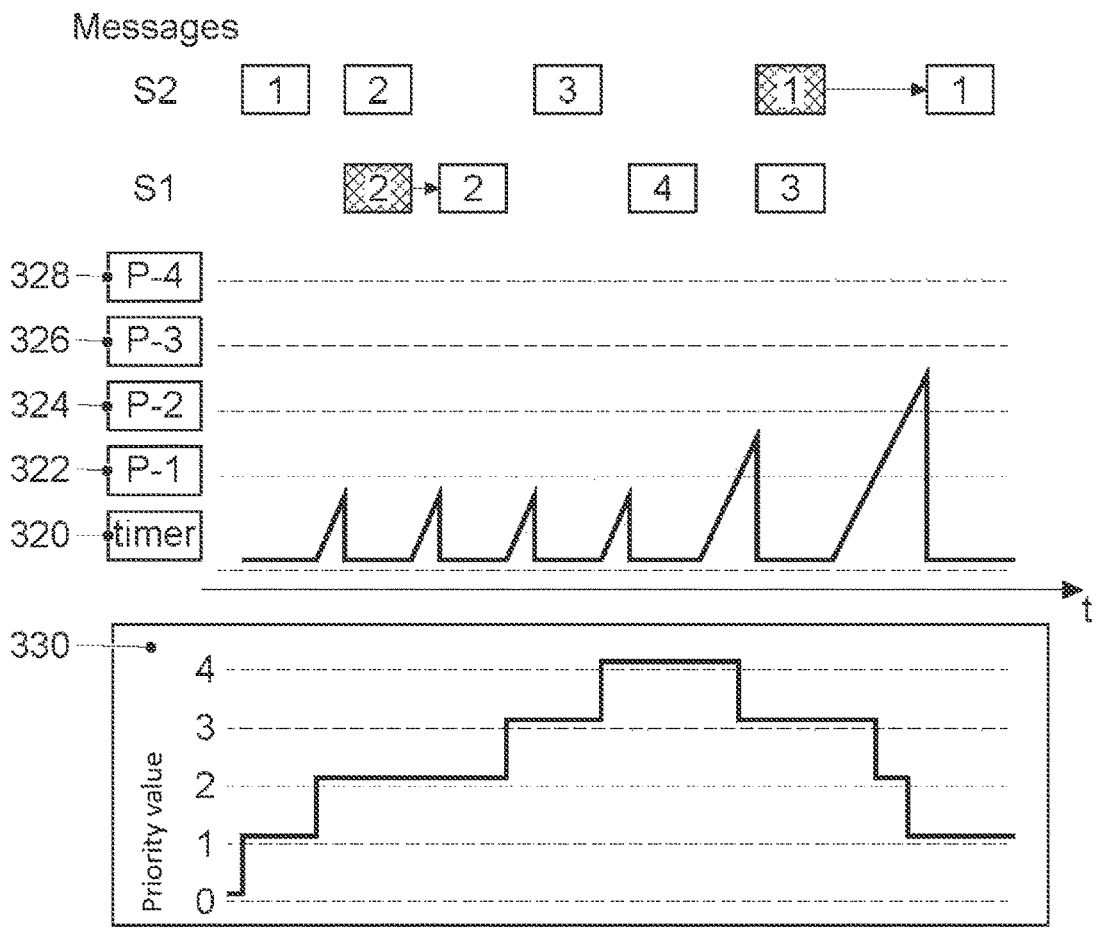
FIG. 7 shows a second exemplary embodiment of how message priorities may be used for controlling bus access.

This variation is shown in FIG. 7. In the implementation described in FIG. 7, the value is decremented by precisely the value "one" when the timeout is exceeded. After double the amount of time, there is a reduction by the value "two", then "three", etc. The value of the permissible minimum priority is thereby reduced stepwise to the value "zero".

FIG. 7 shows a system with two senders. At the beginning of the portrayed message sequence, sender S2 sends a message with priority 1. Then S1 and S2 simultaneously attempt to send a message (with a priority that is the same, or respectively greater than the permissible minimum priority). The employed bus access method ensures that only one of the two messages is actually sent. The other is deferred to a later time. In conjunction with Ethernet, the older CSMA/CD (carrier sense multiple access/collision detection) or the previously mentioned PLCA method may be used for this.

After the value of the permissible minimum priority in FIG. 7 has reached the value 4, the two stations S1 and S2 simultaneously attempt to send a message with priorities 3 and 1. By the stepwise reduction of the permissible minimum priority, S1 may send its message with priority 3 after the timeout has been exceeded, whereas the wish of S2 to send is still suppressed by the described device. Only after the timeout has again been exceeded twice, wherein the permissible priority value is decremented by the value "1" in each case, may S2 send the message with priority 1. In the event that messages with the priority of two or higher had occurred during the wait period, they could have further delayed the sending time for station S2. Another message with priority 1 could have caused this as well, since there exists again a competitive situation for bus access. FIG. 7 shows that the timeout value was exceeded twice sequentially. In order to realize this, additional memory cells 324, 326, 328 may be provided in the network controller chip 23 where the timeout values are entered for which the decrementing is supposed to occur.

If at a certain time several network participants wish to send messages with a priority equal to or greater than the permissible minimum priority, an unpredictable competitive situation (race condition) arises in both of the previously described versions that is only rectified by the bus access method. This results in time behavior that may only be predicted very imprecisely.

Figure 8:
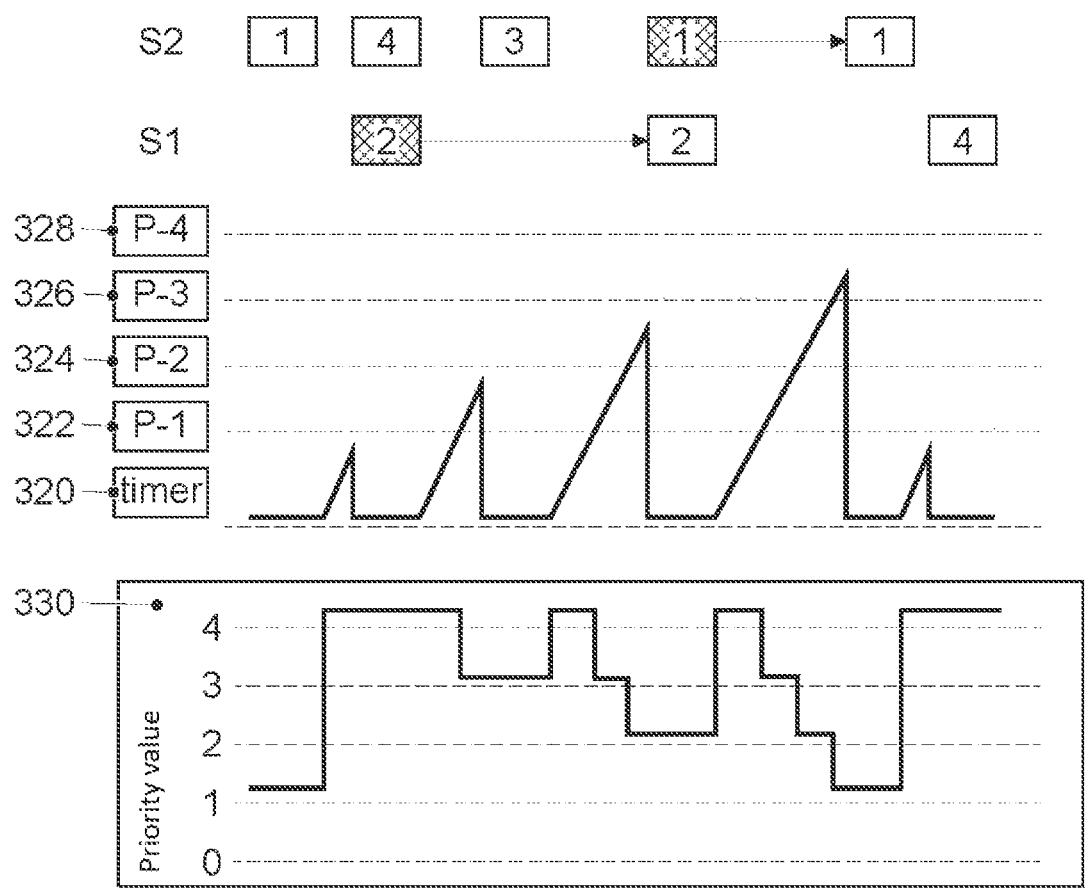
FIG. 8 shows a third exemplary embodiment of how message priorities may be used for controlling bus access.

Consequently, another variation will be described below that is shown in FIG. 8. This variation provides that, after the receipt of a message, the value for the permissible minimum priority in the memory cell 330 is not set to the value of the received message, but rather always to the highest possible value. The value is only reduced when the timeout value is exceeded, or respectively exceeded several times.

Consequently, after the receipt of a message of any priority, first only messages with the highest priority are allowed to be sent. Messages with a lower priority may only be sent when the timeout value has been exceeded once or several times in sequence while waiting to thereby ensure that no ready-to-send high-priority messages exist. FIG. 8 illustrates the behavior. After receiving, or respectively sending the first packet, the memory cell 330 is set to the value "four". Station S2 may send. The memory cell 330 remains at the value "four". After a send pause, the timeout value P1 is exceeded. Decrementing then occurs. The value "three" is entered in memory cell 330. After transmitting the packet with priority 3, the value "four" is again entered. Then the timeout values P-1 and P-2 are sequentially exceeded. The entry in the memory cell 330 decreases to the value "two". The packet is transmitted with priority 2. A long pause then follows with timeout values P-1 to P-2 being exceeded three times. This decreases the entry in the memory cell 330 to the value "one". The packet with priority 1 is nonetheless transmitted after a long waiting phase.

Using the method shown in FIG. 7 may be ensured that sending messages with a high priority always occurs with the minimum possible latency. The latency only results from the sending behavior of other senders with the same priority, as well as the transmission time of any particular message that happens to be on the transmission medium, the end of which must be waited for. To consider the latency of messages with a lower priority, the sending behavior of the same priority as well as all higher priorities must be taken into account.

With an implementation according to FIG. 6 or FIG. 7, it is possible to realize a long sequence of messages of the same priority with the maximum available bandwidth. With an implementation according to FIG. 8, this is possible only for the highest priority. With lower priorities, there always needs to be a pause between the messages to decrement the value of the permissible minimum priority. This reduces the available bandwidth for messages of a low priority.

The method presented here yields difficult to predict behavior when several participants attempt to simultaneously send messages with the same priority. The actual sequence with which the messages appear on the communication medium is regulated in this case by the bus access method. If CSMA/CD is used as the access method, very high and difficult-to-predict latency times may arise in the event of simultaneous access (collision). The PLCA access method is easier to predict. However, it must always be assumed that the relevant network participant may send as the last of all competing participants.

In some embodiments, it may be provided to increase the value range for the utilized priorities and configure the network so that there are no two network participants who are sending with the same priority. When designing a network, it may be established that one of the competing communication participants is always preferred.

With a priority field of 10 bits, 1024 priorities may for example be implemented.

In the methods presented here (all versions), it may transpire that a message with a low priority never gets the opportunity to be sent since, within the required wait time, it may always happen that messages with a higher priority are transmitted, and the wait times then restart.

In order to solve this problem, another optimization is proposed here. The approach consists of automatically raising the priority of a message that cannot be sent over a longer period.

Depending on which network behavior is required, it is useful to support all of the presented options of the method and to configure them when designing a network. The timeout value, or respectively the timeout values, should be adjustable. It should be possible to adjust the increment for decrementing. In the described examples according to FIG. 6 and FIG. 7, the increment is 1. A greater increment may reduce the wait time for messages with a low priority, but may however bring about a priority inversion within the step boundaries. With an algorithm that is based on artificial intelligence, the increment could be estimated in each case or periodically, and adapted in order to achieve optimized network behavior. This expansion could be implemented particularly well in a software solution.

The described method may be implemented as a digital switch within the MAC chip 23, or a chip that contains all the components 21, 22, 23 and 24 as a SoC (system on chip). The memory cell 330 and the timer 320 with the memory cells 322 to 328 are also arranged in the MAC block 23. It is however also possible to implement the method as an algorithm in software. To accomplish this, the algorithm must run each time a message is received independent of whether or not the message is intended for the corresponding network participant.

The disclosure is not limited to the above-described exemplary embodiments. There is room for various adaptations and modifications that a person skilled in the art would consider based on their knowledge in the art and in connection with the present disclosure.

It should be understood that all examples mentioned herein and conditional formulations used herein are not restricted to such specifically cited examples. A person skilled in the art would therefore recognize, for example, that the block diagram shown here is a conceptual view of an exemplary circuit arrangement. Similarly, it should be acknowledged that any flow diagram, state transition diagram, pseudocode and the like shown are different variants for demonstrating processes which may substantially be stored in computer-readable media and which may therefore be executed by a computer or processor.

It should be understood that the proposed method and the associated devices may be implemented in various forms of hardware, software, firmware, special processors or a combination thereof. Special processors may include application-specific integrated circuits (ASICs), reduced instruction set computers (RISCs) and/or field-programmable gate arrays (FPGAs). For example, the proposed method and the device are implemented as a combination of hardware and software. The software is for example installed as an application program on a program memory device. Typically, said device is a machine based on a computer platform that comprises hardware, such as one or more central processing units (CPUs), a random-access memory (RAM) and one or more input/output (I/O) interfaces. Typically, an operating system is also installed on the computer platform. The various processes and functions described here may be part of the application program or a part executed by means of the operating system.

In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

LIST OF REFERENCE NUMERALS

10 Vehicle
21 Bus adaptation circuit
22 Expanded Ethernet PHY block
23 Ethernet MAC block
24 Microcomputer
100 Motor vehicle electronics
102 Data bus—Driver assistance
104 Data bus—Drive
106 Data bus—Chassis
111 Driver assistance control unit
112 RADAR control unit
113 Ultrasonic sensor control unit
121 Engine control unit
122 ESP control unit
123 Transmission control unit
124 Wheel rotational speed sensor
125 Wheel rotational speed sensor
126 Wheel rotational speed sensor
131 Chassis control unit
132 Power steering control unit
140 Gateway
302—
308 Sending time slot
310—
314 Communication cycles
316 Waiting time

What is claimed is:

1. A method for transmitting data on a communication channel, comprising transmitting the data with a transmission frame, wherein the transmission frame has at least one prioritization field for establishing the priority of the message and one data field, wherein the prioritization field serves to regulate the bus access by prioritizing the messages, wherein a bus access control is used in which the priority of at least the last received data packet is saved in a minimum priority memory cell, wherein after a packet is received, starting a timer for which at least one timeout value is set that is reset upon the reception of a following packet, and wherein after the timeout value is reached, decrementing of the value saved in the minimum priority memory cell, and wherein to control bus access when sending a packet, performing a check as to whether the priority of the packet to be sent is less than the value saved in the minimum priority memory cell, and preventing the sending of the packet if the priority of the packet is less than the value saved in the minimum priority memory cell.

2. The method of claim 1, wherein a value saved in the minimum priority memory cell is decremented in each case by the value "one".

3. The method of claim 1, wherein the decrementation value is increased stepwise after the timeout value has been reached two or more times.

4. The method of claim 3, wherein the decrementation value is increased stepwise by the value one after each attainment of the timeout value.

5. The method of claim 1, wherein instead of decrementing the value saved in the minimum priority memory cell, the value saved therein is reset to the value of zero, or another minimum value.

6. The method of claim 1, wherein when a data packet is received, a higher priority value is saved in the minimum priority memory cell instead of the priority value of the received data packet.

7. The method of claim 1, wherein the priority value of a data packet that had to wait in a queue for a certain number of transmission cycles and was still not transmitted is set to a higher value.

8. The method of claim 1, wherein at least one of the at least one timeout value, the decrementation increment, and the reset value are configured to be programmable adjustable.

9. The method of claim 1, wherein the value range for issuing the priority is increased, and the priorities are issued such that there are no two network participants that send the messages with the same priority.

10. A device for performing the method of claim 1, wherein the device has a minimum priority memory cell in which the priority of at least one of the last received data packets is saved, and the device has a timer that is started after the reception of a packet, wherein at least one timeout value may be set for the timer that is reset upon the reception of a following packet, and the device has a decrementing stage that, after the timeout value is reached, performs a decrementing of the value saved in the minimum priority memory cell, and the device has a bus access control unit that, when a packet is being sent, checks whether the priority of the packet to be sent is less than the value saved in the minimum priority memory cell, and the sending of the packet is prevented if the priority of the packet is less than the value saved in the minimum priority memory cell.

11. A communication interface having a device that is designed to perform the steps of the method of claim 1.

12. A computer program, wherein the computer program is designed to execute the steps of the method for transmitting data of claim 1 when processing in a computing unit of a bus interface.

13. The method of claim 2, wherein when a data packet is received, a higher priority value is saved in the minimum priority memory cell instead of the priority value of the received data packet.

14. The method of claim 3, wherein when a data packet is received, a higher priority value is saved in the minimum priority memory cell instead of the priority value of the received data packet.

15. The method of claim 4, wherein when a data packet is received, a higher priority value is saved in the minimum priority memory cell instead of the priority value of the received data packet.

16. The method of claim 5, wherein when a data packet is received, a higher priority value is saved in the minimum priority memory cell instead of the priority value of the received data packet.

17. The method of claim 2, wherein the priority value of a data packet that had to wait in a queue for a certain number of transmission cycles and was still not transmitted is set to a higher value.

18. The method of claim 3, wherein the priority value of a data packet that had to wait in a queue for a certain number of transmission cycles and was still not transmitted is set to a higher value.

19. The method of claim 4, wherein the priority value of a data packet that had to wait in a queue for a certain number of transmission cycles and was still not transmitted is set to a higher value.

20. The method of claim 5, wherein the priority value of a data packet that had to wait in a queue for a certain number of transmission cycles and was still not transmitted is set to a higher value.

\* \* \* \* \*